June 17, 1958 E. J. KASPER 2,839,316
DETACHABLE SUCTION CLEANER SWIVEL COUPLING
Filed March 3, 1954

INVENTOR.
Elmer J. Kasper
BY
Frease & Bishop
ATTORNEYS

United States Patent Office 2,839,316
Patented June 17, 1958

2,839,316

DETACHABLE SUCTION CLEANER SWIVEL COUPLING

Elmer J. Kasper, Cleveland, Ohio, assignor to Royal Appliance Mfg. Co., Cleveland, Ohio, a corporation of Ohio Application March 3, 1954, Serial No. 413,939

2 Claims. (Cl. 285—7)

This invention relates to a detachable swivel coupling for suction cleaners. More particularly it pertains to a swivel coupling between a hose and a tank type cleaner that is airtight.

Detachable swivel couplings between the hose and the end bell of a tank type suction cleaner, such as in the coupling of Pat. No. 2,500,955, have involved certain difficulties in manufacture or use. These prior couplings depend on an annular rubber ring gasket compressed at and sealing the joint between the coupling and cleaner end bell. Such rubber gaskets tend to harden and lose resilience on aging; and also to freeze to the metal coupling and end bell surfaces. The hardening results in loss of the gasketing effect; while the freezing makes it difficult to disconnect the coupling because the end bell tends to turn with the gasket and coupling when the coupling is turned to release the usual bayonet joint between the coupling and end bell. Furthermore, it is usually necessary in such prior constructions to use rubber adhesives to cement the gasket and other parts of the coupling in place.

Also, the various parts of the swivel joint in such prior swivel couplings or connectors, as well as the telescoping formations on the connector and end bell have been expensive to manufacture and assemble while maintaining minimum tolerances necessary for obtaining airtight joints in the connector and proper gasket seating.

Moreover, such prior swivel connectors have included a shoulder in the air passage therethrough, formed by the raw end of the base secured to and within the connector, the presence of which raw hose end shoulder is undesirable.

In addition, such prior swivel connectors have required a separate sealing member for maintaining the swivel joint in the connector airtight, the manufacture and assembly of which has complicated the structure, arrangement and assembly of the swivel joint, thus further increasing the cost of the device.

The present invention has as a primary object the provision of a detachable swivel coupling having self-tensioning gasket means when the coupling is attached to the end bell of a suction cleaner due to greater area of basket contact and to greater gasket compressibility; and which gasket means eliminates prior hardening and freezing difficulties.

Another object of this invention is the elimination of troublesome tubular ring gaskets and of rubber adhesives or cements.

Another object of this invention is the provision of a swivel coupling having sealing means for the swivel joint inexpensive to manufacture and assemble.

Another object of this invention is the provision of a swivel coupling that is relatively inexpensive to make by using parts of simple design, the manufacture and assembly of which does not require close tolerances to be maintained.

Another object of this invention is the provision of a swivel coupling that incorporates a positive gripping means.

Another object of this invention is the provision of a swivel coupling which while satisfying the foregoing objects is simple in construction, airtight in operation, neat in appearance, and in no manner inhibits or decreases the cleaner suction passing therethrough.

These and other objects and advantages apparent to those skilled in the art from the following description and claims may be obtained, the stated results achieved, and the described difficulties overcome, by the discoveries, principles, apparatus, parts, combinations, subcombinations and elements which comprise the present invention, the nature of which is set forth in the following statement, preferred embodiments of which—illustrative of the best modes in which applicant has contemplated applying the principles—are set forth in the following description, and which are particularly and distinctly pointed out and set forth in the appended claims forming part hereof.

The present invention consists broadly in providing a tubular coupling sleeve having bayonet joint connecting means at one end for attachment to the end bell of a suction cleaner, having an external shoulder spaced from said connecting means, and having another end flanged preferably inwardly; a second sleeve having one end spun-riveted over the inner edge of the flanged end of the tubular sleeve by which the sleeves are connected by a swivel joint, the second sleeve being adapted to be telescoped over and connected to the end of a flexible hose; and a molded rubber sleeve disposed over the tubular sleeve having one end overlapping the spun-riveted joint to provide an airtight seal, and having another end formed with an annular channel portion engaged over and abutting the shoulder on the tubular sleeve and also abutting the cleaner end bell when the coupling is connected thereto, whereby engagement of the bayonet joint connecting means causes compression of the channel portion of the rubber sleeve to form an airtight seal between the coupling and cleaner end bell.

Referring to the drawings wherein preferred embodiments of the invention are shown by way of example:

Similar numerals refer to similar parts throughout the various figures of the drawing.

Figure 1:
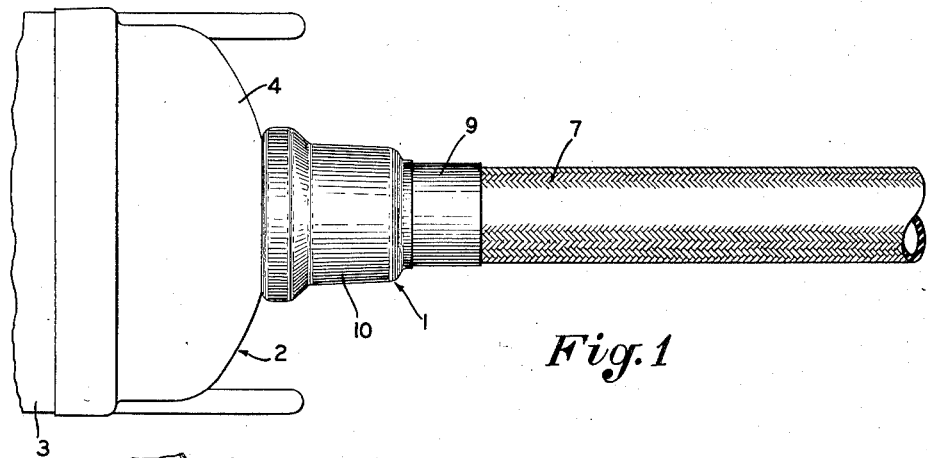
Fig. 1 is a fragmentary plan view of a horizontal tank type suction cleaner showing one embodiment of the improved swivel coupling between the cleaner and a flexible hose.
Figure 2:
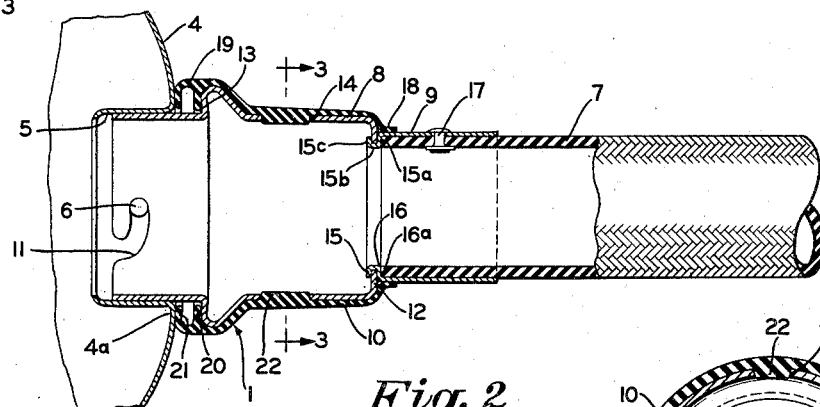
Fig. 2 is a longitudinal sectional view, partly in elevation, showing the manner in which the coupling is attached to the cleaner end bell and in which the hose is attached to the coupling.
Figure 3:
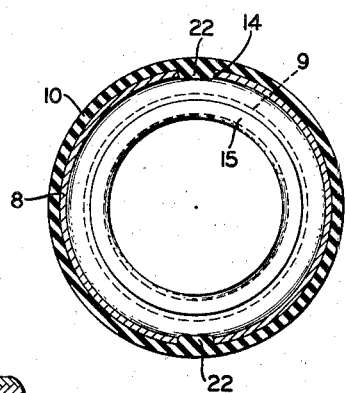
Fig. 3 is a sectional view taken on the line 3—3 of Fig. 2, showing the manner in which radial bosses extend through slots in a sleeve.

In Figs. 1 through 3 there is illustrated one embodiment, indicated generally at 1, of the improved detachable swivel coupling, the coupling 1 being shown in Fig. 1 connected with a horizontal tank type suction cleaner generally indicated at 2, and which includes in combination with other usual tank type suction cleaner parts, a tank 3 usually having a sheet metal end bell 4 including a circular end port flange 5 (Fig. 2) having radially inwardly extending bayonet joint lock pins 6.

The improved swivel coupling 1, attached to the end of a flexible suction hose 7, includes preferably a tubular sheet metal sleeve 8, a second sheet metal sleeve 9, and an elastic rubber sleeve 10. All of said sleeves are preferably circular in cross section.

The tubular sleeve 8 is provided at one end with one or more bayonet joint slots 11 which are adapted to receive the bayonet joint pins 6. At the other end of the sleeve 8 is an integral inwardly extending annular flange 12. The sleeve 8 is provided with an integral annular outwardly extending shoulder 13 between the ends thereof and spaced from the bayonet slots 11. Between the shoulder 13 and flange 12 the sleeve 8 is provided with a plurality of slots or apertures 14.

The axis of sleeve 9 is aligned with the axis of sleeve 8, and sleeve 9 projects from the flanged end of sleeve 8, the sleeve 9 being rotatably mounted by a swivel joint 15 on flange 12.

Thus, the swivel joint end of sleeve 9 is formed with an inturned shoulder flange 15a, a reduced diameter annular portion 15b and an outturned annular flange 15c which form an outwardly opening annular channel groove receiving the free edge of flange 12. The sleeve portions 15a, 15b and 15c are preferably formed by a so-called spinning-riveting operation to secure the same to flange 12 of sleeve 8; and the shoulder flange 15a forms a shoulder 16 against which the raw or cut end 16a of hose 7 abuts when the end of hose 7 is telescoped in sleeve 9 and secured thereto preferably by rivets 17. In this manner the raw edge of the flexible suction hose 7, which is usually of rubber and fabric construction, is sealed and covered by the sleeve portion 15a.

The elastic sleeve 10 surrounds and conforms in contour with the major part of sleeve 8 and is preferably formed as a molded rubber part. One end 18 of the sleeve 10 overlaps the swivel joint 15 between sleeves 8 and 9, and snugly grips a portion of sleeve 9 adjacent the joint 15 to seal the swivel joint in airtight relation while permitting relative rotation of sleeves 8 and 9.

The other end of the sleeve 10 extends over and surrounds shoulder 13 of sleeve 8 and is provided with an annular channel shape 19 which opens inwardly toward the outer surface of sleeve 8. The channel 19 includes channel flanges 20 and 21, flange 20 abutting the radial annular surface of the shoulder 13 facing the end bell 4. The channel flange 21, being spaced from the channel flange 20, is adapted to seat against the annular portion 4a of the end bell 4 surrounding the port 5 when the coupling 1 is inserted into position within the port and held connected thereto by engagement of the pins 6 and slots 11 of the bayonet joint.

Thus channel portion 19 provides an airtight seal between the sleeve 8 and the end bell 4 so that no suction loss can occur at this joint.

The channel portion 19 of sleeve 10 being formed of rubber and having considerable spacing between flanges 20 and 21 permits considerable distortion of the channel portion while securing the coupling 1 to the cleaner end bell 2. Also, the annular flange portions 20 and 21 of the rubber sleeve channel portion 19 have considerable annular contact areas with the sleeve flange 13 and end bell portion 4a, respectively. Thus, the resilience of the rubber and the distortion thereof in securing the coupling 1 to the end bell 2 maintains a gasket-like seating of the channel portion between the cleaner end bell 2 and coupling sleeve flange 13.

Moreover, the shape or configuration of channel portion 19 is such that no hardening of the rubber on aging and freezing thereof by compression between metal surfaces can occur which will affect the efficiency thereof as a gasket in use.

Finally, the particular configuration of the channel portion 19 and the resilience thereof tensions the bayonet joint connection between the coupling 1 and end bell 2 to prevent accidental detachment of the coupling 1.

Besides providing an airtight seal between the sleeve 8 and the end bell 4, the elastic sleeve 10 also provides an airtight seal around the swivel joint 15. Since the end 18 of the sleeve 10 overlies the swivel joint 15 and fits snugly against the surface of the sleeve 9 beyond swivel joint 15, an airtight seal is maintained even when the sleeve 9 is rotated in sleeve 8. However, the swivel action between the sleeves 8 and 9 can take place because of the resilience or yielding of the rubber.

The sleeve 10 is provided with a number of inwardly projecting integral bosses or lugs 22, which are radially disposed and register with the slots or apertures 14 in the sleeve 8 through which the bosses 22 extend. This maintains proper assembly of the rubber sleeve 10 to the metal sleeve 8 without the use of adhesives. In addition, the bosses 22 transmit rotative force to the coupling 1 in order to attach and detach the coupling 1 from the port 5, when the sleeve 10 is gripped by the hand of the operator and rotated, to engage or disengage the bayonet joint.

Finally, the rubber sleeve 10 in being formed of rubber, and in surrounding the major portion of coupling 1, provides an excellent hand grip by which the coupling may be grasped and manipulated without slipping in the hand.

Figure 4:
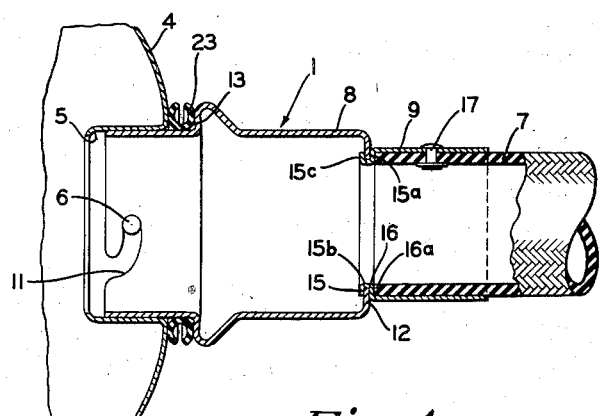
Fig. 4 is a longitudinal sectional view, partly in elevation, of another embodiment of the present invention showing the manner in which an elastic gasket is compressed between the coupling and the end bell of a suction cleaner.

Another embodiment of the improved coupling is shown in Fig. 4. It includes the sleeves 8 and 9 having configurations identical to those set forth above. However, an elastic sleeve, such as the sleeve 10 included in the first embodiment, is not used in the second embodiment. Rather, an annular gasket 23 having a rounded channel cross section, opening outwardly, is disposed around the sleeve 8 and abutting shoulder 13 and end bell 4. The purpose of the gasket 23 is similar to that provided by the channel portion 19 of the sleeve 10. Thus, the gasket 23 provides an airtight seal between the sleeve 8 and the end bell 4 besides providing sufficient tension between said parts to hold them in place and to prevent the accidental detachment of the coupling from its position within the port 5. Inasmuch as no elastic sleeve is disposed over the sleeve 8 in the embodiment shown in Fig. 4, there are no slots or apertures in said sleeve similar to the slots or apertures 14 in Fig. 2. The construction of Fig. 4 provides a more inexpensive structure than that set forth in Fig. 2 for less expensive model cleaners.

The new coupling construction of the invention provides a more satisfactory detachable swivel coupling than prior constructions. The spun riveted joint between the sleeves 8 and 9 is a simple and inexpensive means for obtaining a swivel connection between the flexible hose 7 and the end bell 4 of the cleaner.

The elastic sleeve 10 serves to seal the coupling 1 to the end bell 4 in an airtight manner, to seal the swivel joint between the sleeves 8 and 9 in an airtight manner, to provide a positive tensioning of the coupling whenever the coupling is attached to the cleaner, to provide a rubber hand grip, and to provide a positive connection without adhesive material between sleeves 8 and 10. These features are obtained by the use of a minimum number of parts which may be fabricated in a relatively inexpensive manner because the fittings between the parts as well as between the sleeves 8 and the port 5 need not be made with close tolerances. By permitting wider tolerances and using an elastic sleeve having the features described, a satisfactory airtight coupling is provided eliminating the prior art difficulties.

Accordingly, the present invention provides a new detachable swivel coupling construction for a suction cleaner which is easily connected to a tank type cleaner, which is simple in construction, which has self-tensioning means when attaching a hose to a cleaner tank, which provides positive sealing means for both the swivel and detachable joints of the coupling, which eliminates prior troublesome gasket tubing difficulties, which has a neat appearance, which seals and covers the raw end of the hose to which the coupling is attached, which does not require the use of adhesives or rubber cement in the assembly of the coupling, and which incorporates the new and advantageous features herein described, overcomes the prior art difficulties indicated, and solves long standing problems in the art.

In the foregoing description, certain terms have been used for brevity, clearness and understanding; but no unnecessary limitations are to be implied therefrom beyond the requirements of the prior art, because such terms are utilized for descriptive purposes herein and not for the purpose of limitation and are intended to be broadly construed.

Moreover, the description of the improvements is by way of example, and the scope of the present invention is not limited to the exact details illustrated and described.

Having now described the features, discoveries and principles of the invention, the characteristics of the new detachable coupling structure, and the advantageous, new and useful results provided; the new and useful discoveries, principles, parts, elements, combinations, sub-combinations, structures and arrangements, and mechanical equivalents obvious to those skilled in the art, are set forth in the appended claims.

I claim:

1. A swivel coupling on an attachment hose for connection with a suction cleaner having an outer surface with a suction port therein, the coupling including a rigid tube on one end of the hose, a first sleeve connected to the tube, the first sleeve having an end flanged inwardly, the tube having an outwardly opening channel receiving the inwardly flanged end of the sleeve, the first sleeve having an end portion releasably insertable within the suction port, the first sleeve also having an outwardly extending annular shoulder adjacent said portion, a resilient sleeve surrounding the first sleeve including the shoulder and having one end overlapping the connection with the tube in an airtight manner, the resilient sleeve also having another end terminating in a compressible channel portion abutting the side of the shoulder facing said end portion of the sleeve, the channel portion having an outer diameter substantially equal to that of the shoulder, and the distance between the shoulder and the outer surface of the cleaner being slightly less than the width of the uncompressed channel portion of the resilient sleeve when the first sleeve is inserted in the suction port.

2. A swivel coupling for an attachment hose for connection with a suction cleaner having an outer surface with a suction port therein, the coupling including a rigid tube on one end of the hose having an outwardly opening channel in the surface thereof, a first sleeve having an inwardly turned flange rotatably engaging the channel on the tube, one portion of the channel including an inturned shoulder flange, said one end of the hose being in abutment with said inturned shoulder flange, the first sleeve also having an end portion releasably insertable within the suction port and having an outwardly extending annular shoulder adjacent said portion, a resilient sleeve surrounding the first sleeve including the shoulder and having one end overlapping the tube in an airtight manner, the resilient sleeve also having another end terminating in a U-shaped channel portion with one leg thereof abutting the shoulder of the first sleeve and another leg spaced therefrom, the channel portion having an outer diameter substantially equal to that of the shoulder, and the channel portion being compressible between the shoulder and the outer surface of the suction cleaner when the end portion of the sleeve is mounted within the suction port.

References Cited in the file of this patent
UNITED STATES PATENTS

| | | |
|---|---|---|
| 1,861,402 | Van Riper | May 31, 1932 |
| 2,052,967 | Carlstedt | Sept. 1, 1936 |
| 2,245,151 | Martinet | June 10, 1941 |
| 2,260,500 | Wylie | Oct. 28, 1941 |
| 2,500,955 | Martinet et al. | Mar. 21, 1950 |
| 2,523,770 | Marette | Sept. 26, 1950 |

OTHER REFERENCES

Cawl: Abstract of application Serial No. 227,449, published October 14, 1952.